C. W. R. CAMPBELL AND F. G. A. ROBERTS.
PRODUCTION OF COLOR PICTURES.
APPLICATION FILED NOV. 30, 1915.
1,427,578.                                    Patented Aug. 29, 1922.
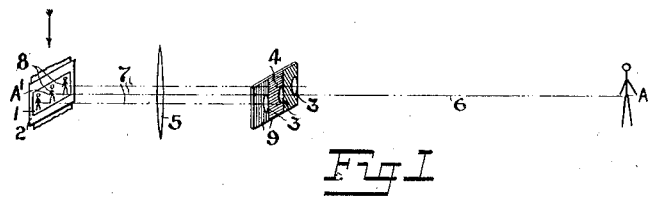
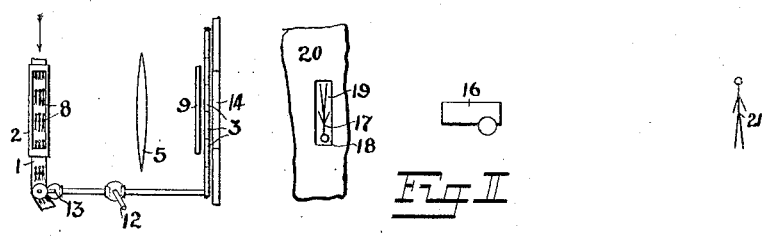
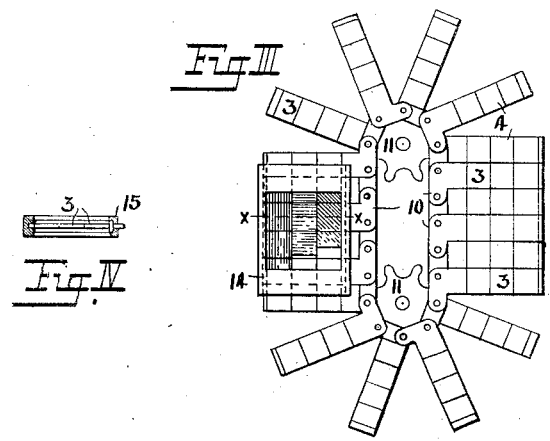
INVENTORS;
Charles William Rea Campbell
Frisch Gowyne Alfred Roberts
BY Wm Wallace White
ATT'Y

UNITED STATES PATENT OFFICE.

CHARLES W. R. CAMPBELL, OF GERMISTON, AND FRANK G. A. ROBERTS, OF PARKTOWN, JOHANNESBURG, TRANSVAAL, SOUTH AFRICA.

PRODUCTION OF COLOR PICTURES.

1,427,578.     Specification of Letters Patent.     Patented Aug. 29, 1922.

Application filed November 20, 1915. Serial No. 64,328.

*To all whom it may concern:*

Be it known that CHARLES WILLIAM REA CAMPBELL, resident of Driehoek, Germiston, Transvaal, and FRANK GOWYNE ALFRED ROBERTS, resident of corner of Victoria and St. Patricks Avenues, Parktown, Johannesburg, Transvaal, South Africa, both British subjects, have invented certain new and useful Improvements in the Production of Color Pictures, of which the following is a specification.

The present invention relates to the exhibition of pictures,—particularly moving pictures, in color, and to the photographic production of records therefor.

The purpose of the invention is to provide a system by which the superimposition of component images, to form a color picture, is readily attained.

In the accompanying drawings—

Fig. I is an illustrative diagram.

Fig. II shows the general arrangement of means for photographing or projecting moving color pictures.

Fig. III is a detail view taken at right angles to Fig. II and showing the chain of lenses.

Fig. IV is a section on the plane $x$—$x$ Fig. III.

In Fig. I, 1 indicates a picture support (herein called a film) carried in a gate or holder 2. Said film is shown movable in the direction of its length, as indicated by the arrow.

3 indicates a number of similar lenses, which are shown as simple lenses but which may be appropriate optical systems. They are arranged in a group 4, comprising two or more. The elements of the group are conveniently arranged transversely to the direction of movement of the film with the object of keeping the series of pictures of different color values distinct from one another, as will appear hereafter.

Said lenses 3 are combined with a fixed lens 5 in a parallel plane and so arranged that the conjugate foci A, A¹, of the combination are respectively on the principal axis 6 of the fixed lens 5 on the side of the combination remote from the film, and on the principal axes 7 of the lenses 3 in the plane of the film. Such a combination is afforded by placing the fixed lens 5 between the group of lenses 3 and the film, in such a position that the pitch of the images 8 produced on the film by the combination, equals the pitch of the lenses 3.

Color filters 9 are suitably arranged to filter the light transmitted by each or some of the lenses 3.

In taking photographs with arrangement described, the lenses constituting the group 4 are exposed simultaneously or substantially so, and at each exposure there is formed on the film 1 a group of pictures 8, all of which are identical except only as regards the different color values of the light by which they are severally impressed. Upon such pictures being suitably dealt with for projection, and then illuminated and projected together through similar apparatus, the individual images from the several pictures are superimposed and blended at the front focus of the system 3, 5 and form a complete color picture.

In practically carrying out the invention it is preferred to employ a series of groups 4 of the lenses 3, and to move them and the film continuously and together. The optical combination described allows this to be done without displacement of the image produced on the film or the viewing screen as the case may be.

The arrangement for this purpose is indicated in Fig. III. A number of groups 4 of the lenses 3 are formed into an endless series and mounted on the links of a chain 10. Said chain passes over sprockets 11, one of which is driven by the crank 12, which also drives the film through the mechanism 13. Whilst passing the exposure aperture 14 the groups 4 are guided for steady movement by guides 15, Fig. IV.

The aperture 14 through which the lenses are exposed is preferably wide enough to allow several groups 4 to be exposed together. The color filters 9 may be fixed strips covering the different paths of the longitudinal series of lenses 3. For projection purposes, said filter strips 9, or some of them, may be shorter than the length of the aperture 14 (Fig. III) so that the composite image 21 is partly made up of uncolored light. They may also be differently colored or tinted along their length with the object of enhancing the coloration of the projected image.

In taking pictures it is necessary to have some means to prevent overlapping of the images produced on the film. This may be accomplished by providing an optical system 16 which produces a plane image 17 on a translucent screen 18 placed in an aperture 19 of a partition 20, or a plane aerial image at the same point. This arrangement is described in our application No. 64,326, filed Nov. 30, 1915, and it may usefully be employed for projection also.

We claim—

The combination of means for continuously moving a film, groups of lenses movable with the film, the lenses of each group being disposed transversely of the length of the film, a fixed lens cooperating with the movable lenses to compensate for the movement thereof, and color filters for the movable lenses.

In testimony whereof we affix our signatures

C. W. R. CAMPBELL.
FRANK G. A. ROBERTS.